Aug. 28, 1934. E. H. LORELLI 1,971,824
SPEED TRANSMISSION FOR AUTOMOBILES AND THE LIKE
Filed Oct. 10, 1933 2 Sheets-Sheet 1
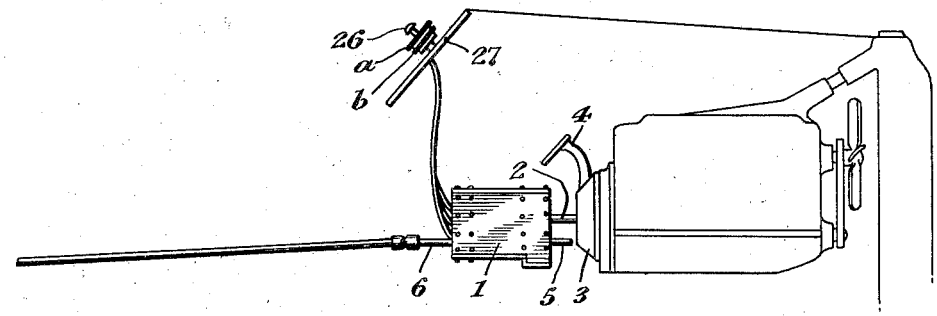
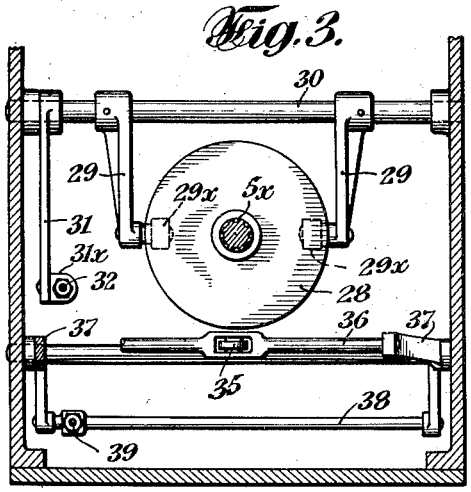
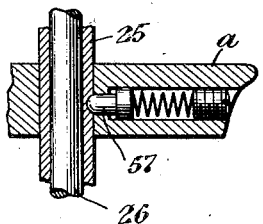
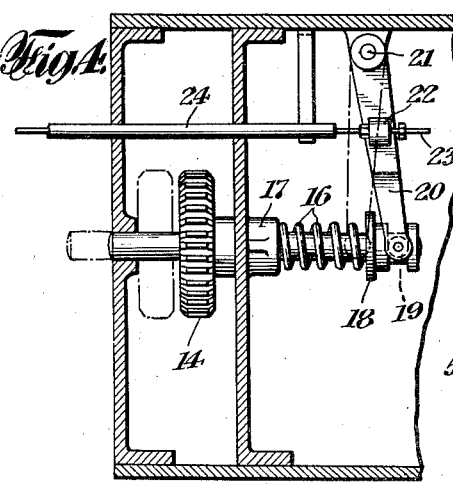
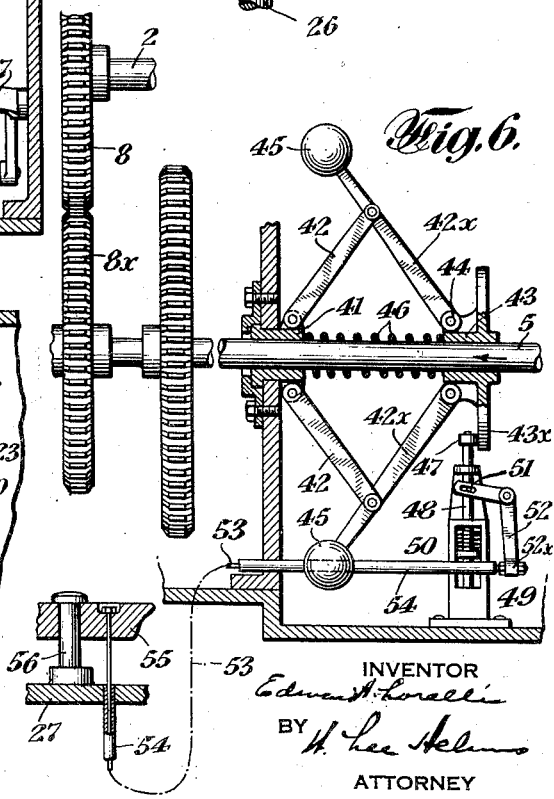
INVENTOR
BY
ATTORNEY

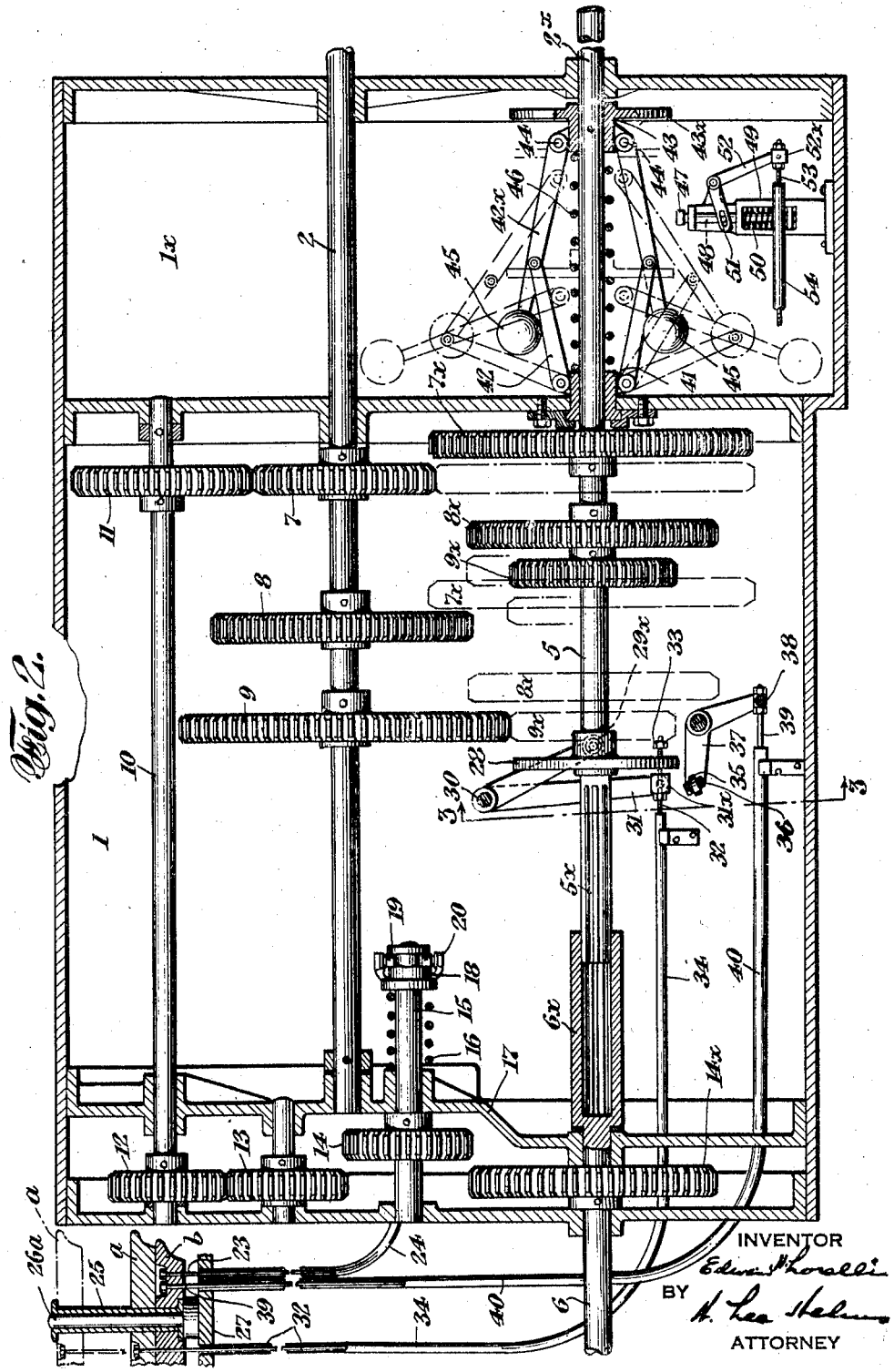

Patented Aug. 28, 1934

1,971,824

UNITED STATES PATENT OFFICE 1,971,824

SPEED TRANSMISSION FOR AUTOMOBILES AND THE LIKE

Edward H. Lorelli, New York, N. Y.

Application October 10, 1933, Serial No. 692,942

6 Claims. (Cl. 74—336.5)

The object of the present invention is to provide a transmission for automobiles and the like having an improved automatic gear changing characteristic together with a simplified means for insuring the action of the automatic speed change without interference with means for throwing the transmission into reverse.

Further objects of the invention will hereinafter be described.

The invention will be described with reference to the accompanying drawings in which Fig. 1 is a diagrammatic view in elevation showing the device applied to an automobile and indicating the position of certain manual controls.

Fig. 2 is a sectional elevation of the gear box and its enclosed elements, part of the manual controls being illustrated adjacent the box.

Fig. 3 is a vertical fragmentary section taken on the line 3—3, Fig. 2, looking in the direction of the arrow.

Fig. 4 is a fragmentary view in horizontal section showing certain elements of the reverse speed change.

Fig. 5 is a detailed view showing spring-latching means for the control button.

Fig. 6 is a vertical section through the gear box toward the rear end thereof, showing main and counter shaft second speed gears in mesh and means for holding the automatic speed changing mechanism against action.

The embodiment of the invention illustrated in the drawings comprises a casing 1 having a rear section 1x containing elements of the automatic gear change mechanism and control therefor.

By reference to Figs. 1 and 2, it will be noted that the motor drives shaft 2x through the usual intermediary of a clutch 3, the clutch pedal being indicated at 4, Fig. 1, shaft 2 being connected by gearing with an automatically and manually controlled shaft 5 having splined end 5x sliding in the sleeve-like end 6x of main drive shaft 6, the inner wall of member 6x being grooved in accordance with the splines of member 5x.

Shaft 2 carries a first-speed gear 7 adapted to mesh with a corresponding gear 7x on shaft 5. Drive shaft 2 also carries a second-speed gear 8 adapted to mesh with a second-speed gear 8x on shaft 5; and shaft 2 carries a high-speed gear 9 adapted to mesh with high-speed gear 9x on shaft 5. Each of these gears is fixed upon the shaft which carries it.

Above shaft 2 is a reverse counter shaft 10 carrying a gear 11 in mesh with drive gear 7. Shaft 10 also carries a gear 12 in mesh with a counter gear 13 adapted to mesh with reverse gear 14 on an endwise movable shaft 15, gear 14 normally being held out of mesh with gear 13 by means of a spring 16, one end of the spring engaging casing wall 17 and the other end engaging a channeled collar 18. In the channel of the collar are opposed rollers 19 carried at the lower end of a lever 20 fulcrumed at 21 and having a lateral apertured boss 22 carrying a Bowden wire 23, the latter passing through a tube 24 and having its upper end fixed to a pull button $b$ having an axial sleeve 25 slidably mounted on a post 26 secured to the dash 27.

Fixed to shaft 5 and rotating therewith, is a disk 28, the disk being engaged by rollers 29x of levers 29 fixed upon an oscillating shaft 30, the latter also carrying a crank arm 31 having a lateral boss 31x apertured to receive a Bowden wire 32 threaded at its end to receive an adjustable nut 33, the wire passing through a tube 34 and being fixed to a control button $a$ slidably mounted on sleeve 25 at the dash board 27. Normally below, but adapted to be moved upwardly against disk 28, is a stop roller 35 carried on a bar 36, carried by rock levers 37, the rock levers being connected by rod 38 apertured to receive a Bowden wire 39 led through tube 40 and secured to pull button $b$.

Within compartment 1x and fixed to shaft 5, is a collar 41 having a plurality of ears pivotally supporting a plurality of toggle links 42 connected at their end to co-acting toggle links 42x, the latter being pivotally connected to a collar 43 fixed upon shaft 5. Toggle links 42x at their ends opposite pivots 44 carry weights 45, any desired number of weight operated toggles may be connected to the collars 41 and 43. Collar 41 is held against endwise movement relatively to the shaft 5. Thus, when shaft 5 rotates beyond a predetermined minimum speed, weights 45 swing outwardly by centrifugal action and the toggle links tend to move collar 43 toward collar 41. Inasmuch as collar 43 is fixed to shaft 5, the latter will be given endwise movement against the tension of a spring 46.

Collar 43 carries a disk 43x and immediately below the range of movement of the disk is a stop roller 47 carried by a rod 48 endwise movable in a supporting standard 49, the rod being normally maintained in lowermost position by a spring 50, a section of the rod projects laterally of the standard and carries a pin 51 disposed in a slot formed in the upper arm of a lever 52, the lower end of the lever having an apertured boss 52x receiving a Bowden wire 53 led through tube 54 leading to the dash, the wire being connected to a pull button 55 slidably mounted on a post 56 carried by the dash 27.

When pull button 55 is moved to the position of Fig. 6, roller 47 will be carried upwardly into the path of disk 43 and will serve to hold the automatic speed change mechanism against further movement of shaft 5 in the direction of the arrow on the shaft.

In the operation of the device, the motor is started thus revolving shaft 2, the gears of the latter being initially out of mesh with the gears of shaft 5.

To bring the gears into first speed mesh, pull button a is moved upwardly to the dotted line position, Fig. 2, carrying nut 33 toward the lower end of lever 31 until the nut reaches the lever and actuates it, thus causing lever arms 29 through rollers 29x to engage disk 28 and thereby impart endwise movement to shaft 5, bringing first speed gear 7x into mesh with gear 7. As the speed of shaft 5 increases in the propulsion of the automobile, weights 45 will act upon the toggle members to move shaft 5 in such manner as to bring second speed gear 8x in mesh with gear 8, disk 28 being moved away from rollers 29x. As the car increases its speed with corresponding increased rotation of shaft 5, the said automatic gear change mechanism will impart a further movement to shaft 5 bringing high speed gear 9x into mesh with gear 9. Thus, it will be seen that the speed changing is automatic after manual movement of the first speed gears into mesh. Suitable latching means may be applied to the manual operated control of the first speed, as, for example, a spring pressed detent 57 in button a adapted to enter a socket in sleeve 25. After the first speed gears have been placed in mesh, the button may be pushed back into initial position.

To bring the gears into reverse, the car will be brought to a stop whereupon the automatic speed change mechanism through the action of spring 46 will move shaft 5 into neutral position, as shown in Fig. 2. Pull button b will then be pulled out a short distance, Bowden wire 32 moving idly, the distance required being insufficient to carry nut 33 into actuating engagement with lever 31. Such movement of pull button b will, however, give an endwise movement to Bowden wire 23 sufficient to actuate lever 20 and thereby move shaft 15 to the left from its position in Fig. 2 and carry reverse gear 14 into mesh with counter gear 13 and reverse gear 14x on shaft 6, thus causing reverse movement of shafts 6 and 15. The automatic speed change mechanism is held against action in the reverse rotation of shafts 5 and 6, due to the fact that the said movement of pull button b will impart endwise movement to Bowden wire 39 causing lever 37 to rock and carrying stop roller 35 into engagement with disk 28. When the reversing action is completed, pull buttons a and b will be pushed down to initial position.

Where, on climbing a hill, it is necessary to hold the second speed gears in mesh for a relatively long period, means are provided for latching the automatic change speed mechanism. To that end, pull button 55 on the dash is moved outwardly, thus causing Bowden wire 53 to actuate the lever 52, carrying roller 47 in the path of disk 43 to hold the disk against moving from second speed position to high speed position.

It will be understood that various modifications may be made in the form and arrangement of the elements comprising the embodiment illustrated in the drawings without departing from the spirit of the invention.

What I claim and desire to secure by Letters Patent, is as follows:—

1. Speed change mechanism for automobiles and the like, comprising a gear box having therein an engine rotated shaft and a sectional main drive shaft, first, second and third speed gears on the engine driven shaft, first, second and third speed gears on a section of the main drive shaft, slidably connected to the second section thereof, centrifugal weight controlled levers rotated by the main drive shaft for sliding one shaft section relatively to the other to carry the first, second and third gears successively into mesh, manually controlled means for relatively moving the sections of the main drive shaft to intermesh the first speed gears, and manually controlled means for controlling the sections of the main drive shaft against such relative movement by the centrifugal weight actuated levers as to move the second speed gears out of mesh in a direction tending to effect meshing of the high speed gears.

2. Speed change mechanism for automobiles and the like, comprising a gear box having therein an engine rotated shaft and a sectional main drive shaft, first, second and third speed gears on the engine driven shaft, first, second and third speed gears on a section of the main drive shaft slidably connected to the second section thereof, centrifugal weight controlled levers rotated by the main drive shaft for sliding one shaft section relatively to the other to carry the first, second and third gears successively into mesh, a lever operatively engaging the slidably movable section of the main drive shaft and a manually operable control for said lever adapted to be mounted on the dashboard of an automobile and adapted to be mounted within range of the driver's seat of an automobile for actuating the shaft to carry the first speed gears into mesh, said means being adapted to permit free action of the centrifugal weight controlled levers for thereafter moving said shaft sections to positions for successively meshing the second speed and high speed gears.

3. Speed change mechanism for automobiles and the like, constructed in accordance with claim 2 in which the manually controlled means comprises a Bowden wire connected to the lever, a tube receiving said wire and leading to a fixed support, a post carried by said support, and a pull button connected to the wire and slidably movable on the post.

4. Speed change mechanism for automobiles and the like, comprising a gear box having therein an engine rotated shaft and a sectional main drive shaft, first, second and third speed gears on the engine driven shaft, first, second and third speed gears on a section of the main drive shaft slidably connected to the second section thereof, centrifugal weight controlled levers rotated by the main drive shaft for sliding one shaft section relatively to the other to carry the first, second and third gears successively into mesh, manually controlled means for relatively moving the sections of the main drive shaft to intermesh the first speed gears, a reverse gear carried by a section of the main drive shaft, a reverse gear actuated by the engine driven shaft, a counter shaft reverse gear, means for simultaneously throwing the counter shaft gear into operative position and for controlling the sections of the main driving shaft against such relative movement by the centrifugal weight actuated levers as to effect meshing of the first speed gears, said last-named means comprising a counter shaft actuating lever, a Bowden wire connected to said lever, a tube receiving said wire and connected to a fixed support, a post on said support, a pull button slidably mounted on said post and connected to the said Bowden wire, a stop lever adapted to engage a rotating member of the main drive shaft, a Bowden wire connected to said stop lever, a tube receiving said Bowden wire and connected to said fixed support and a connection between said pull button and said last-named Bowden wire.

5. Speed change mechanism for automobiles and the like, comprising a gear box having therein an engine rotated shaft and a sectional main drive shaft, first, second and third speed gears on the engine driven shaft, first, second and third speed gears on a section of the main drive shaft slidably connected to the second section thereof, centrifugal weight controlled levers rotated by the main drive shaft for sliding one shaft section relatively to the other to carry the first, second and third gears successively into mesh, a reverse gear carried by a section of the main drive shaft, a reverse gear actuated by the engine driven shaft, a counter shaft reverse gear, means for relatively moving the sections of the main drive shaft to intermesh the first speed gear comprising a fixed support adapted to be placed within range of the driver's seat of an automobile, a post on said support, a pull button slidably mounted upon the post, a Bowden wire connected to the pull button, a lever operatively engaging the slidable section of the main drive shafts and connected to said Bowden wire, and means for simultaneously meshing the reverse gears and controlling the sections of the main driving shaft against relative movement.

6. Speed change mechanism for automobiles and the like, comprising a gear box having therein an engine rotated shaft and a sectional main drive shaft, first, second and third speed gears on the engine driven shaft, first, second and third speed gears on a section of the main drive shaft, slidably connected to the second section thereof, centrifugal weight controlled levers rotated by the main drive shaft for sliding one shaft section relatively to the other to carry the first, second and third gears successively into mesh, manually controlled means for relatively moving the sections of the main drive shaft to intermesh the first speed gears, a reverse gear carried by a section of the main drive shaft, a reverse gear actuated by the engine driven shaft, a counter shaft reverse gear, means for simultaneously throwing the counter shaft gear into operative position and for controlling the sections of the main driving shaft against such relative movement by the centrifugal weight actuated levers as to effect meshing of the first speed gears, said means for controlling relative movement of the sections of the main driving shaft comprising a latch for the slidably moving section, and a dash control operating member for said latch.

EDWARD H. LORELLI.